United States Patent
Woolfson

(10) Patent No.: US 6,945,666 B2
(45) Date of Patent: Sep. 20, 2005

(54) ILLUMINATION DEVICE WITH REMOVABLE POWER PACK

(75) Inventor: Alan Julian Woolfson, Milford, NH (US)

(73) Assignee: Monarch Instrument, Amherst, NH (US)

( * ) Notice: Subject to any disclaimer, the term of this patent is extended or adjusted under 35 U.S.C. 154(b) by 131 days.

(21) Appl. No.: 10/609,767

(22) Filed: Jun. 30, 2003

(65) Prior Publication Data

US 2004/0264181 A1 Dec. 30, 2004

(51) Int. Cl.[7] .............................................. F21L 14/02
(52) U.S. Cl. .................... 362/183; 362/9; 362/194; 362/208; 315/136; 356/23
(58) Field of Search ................... 362/9, 183, 109–114, 362/3, 8, 157, 194, 199, 202, 206, 208, 255, 263, 265, 362, 253; 315/76, 84.51, 129, 136, 360; 73/466, 488, 499; 466/1.01; 356/23, 25

(56) References Cited

U.S. PATENT DOCUMENTS

| | | | | |
|---|---|---|---|---|
| 1,506,302 A | * | 8/1924 | Hopkins | 362/183 |
| 2,818,498 A | * | 12/1957 | Foch | 362/183 |
| 3,787,678 A | * | 1/1974 | Rainer | 362/183 |
| 3,952,190 A | * | 4/1976 | Perkins | 362/4 |
| 4,045,663 A | * | 8/1977 | Young | 362/183 |
| 4,065,700 A | | 12/1977 | Liebman | |
| 4,117,395 A | * | 9/1978 | Redfield | 315/241 S |
| 4,345,304 A | * | 8/1982 | Penney et al. | 362/183 |
| 4,357,648 A | * | 11/1982 | Nelson | 362/183 |
| 4,530,034 A | * | 7/1985 | Kawarada | 362/9 |
| 4,563,629 A | * | 1/1986 | Keiper | 362/183 |
| 4,692,668 A | | 9/1987 | Brown | |
| 4,876,632 A | * | 10/1989 | Osterhout et al. | 362/183 |
| 5,103,383 A | * | 4/1992 | Mayhew | 362/183 |
| 5,172,031 A | * | 12/1992 | Matsui et al. | 362/267 |
| 5,626,979 A | * | 5/1997 | Mitsui et al. | 362/9 |
| 5,746,495 A | * | 5/1998 | Klamm | 362/183 |
| 6,290,367 B1 | * | 9/2001 | Greenhoe et al. | 362/183 |
| 6,471,367 B2 | * | 10/2002 | Garofalo | 362/183 |
| 6,804,461 B1 | * | 10/2004 | Hagiuda et al. | 362/9 |

OTHER PUBLICATIONS

Provisional U.S. Appl No. 60/370,625, filed Apr. 6, 2002, Alan J Woolfson.
Catalog—Pioneer Electric & Research (Company now defunct) Digital Porta–Strobe.

* cited by examiner

Primary Examiner—Thomas M. Sember
Assistant Examiner—Ismael Negron
(74) Attorney, Agent, or Firm—Gauthier & Connors, LLP

(57) ABSTRACT

A portable, cable free, industrial troubleshooting stroboscope includes a housing having a light source, a control circuitry, a display and a user control mechanism. A pair of power terminals internal to the housing connect to a removable power pack. One or more easily removable replenishable power packs with mating power terminals connect internally to the housing. Means used to directly replenish the removable power pack is in or out of the housing are also included.

12 Claims, 4 Drawing Sheets

ILLUMINATION DEVICE WITH REMOVABLE POWER PACK

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION — FIELD OF INVENTION

The present invention relates generally to the field of diagnostic electronic instrumentation and more particularly to industrial type portable stroboscopes used for inspection and speed measurement, and, specifically, to such stroboscopes that are battery powered, requiring no power cable attachment.

BACKGROUND OF THE INVENTION

The use of stroboscopes in industry to observe motion and measure speed is well known. Battery powered portable stroboscopes enable the operator to do inspections at remote locations without the need to be connected to an AC power source. Furthermore since stroboscopes are typically used to monitor rotating or moving parts, any cables attached to the stroboscope may potentially snag on those parts and create safety issues, or may restrict the operator's use of the instrument.

Traditional portable stroboscopes have internal rechargeable batteries that are captured within the stroboscope housing and cannot be easily removed, permitting operation for relatively short periods of time, typically one to two hours, before requiring recharging. Once the batteries are discharged, the operator cannot use the stroboscope and has to stop and recharge the batteries, a process taking several hours to over night. This is unproductive and unsatisfactory for those users who require portability and extended operation from their product.

By utilizing an easily replaceable power pack that fits integrally into the stroboscope housing, the operator has a comfortable hand held, cable free instrument that can be used for extended periods, by simply having extra power packs and simply replacing the one in the stroboscope as needed.

The extra power packs can be recharged remote from the stroboscope essentially providing continuous operation apart from the short time required to exchange power packs in the stroboscope.

BACKGROUND OF THE INVENTION— OBJECTS AND ADVANTAGES

The primary object of the invention is:
a) To provide extended operation of a portable stroboscope by using a removable battery pack.
b) To eliminate the need for any power cable attachment.
c) To provide a simple mechanism for inserting and removing the battery pack.

The advantages of this invention over traditional stroboscopes are:
a) an operator with a number of power packs can easily exchange these power packs within the stroboscope as they become discharged and remain operational for extended periods of time.
b) an operator need not be concerned with safety issues relating to cables attached to the stroboscope.
c) an operator can recharge spent power packs outside the stroboscope, while the stroboscope continues to operate with alternate charged power packs Other objects and advantages of the present invention will become apparent from the following descriptions, taken in connection with the accompanying drawings, wherein, by way of illustration and example, two embodiments of the present invention are disclosed.

SUMMARY

Briefly, in accordance with the present invention, an easily removable power pack fits into the stroboscope housing to form a compact, hand-held cable free instrument.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

The organization and method of operation of the invention, as well as further objects and the advantages thereof, can best be understood by reference to the following specification in conjunction with the accompanying drawings, in which.

Figure 1:
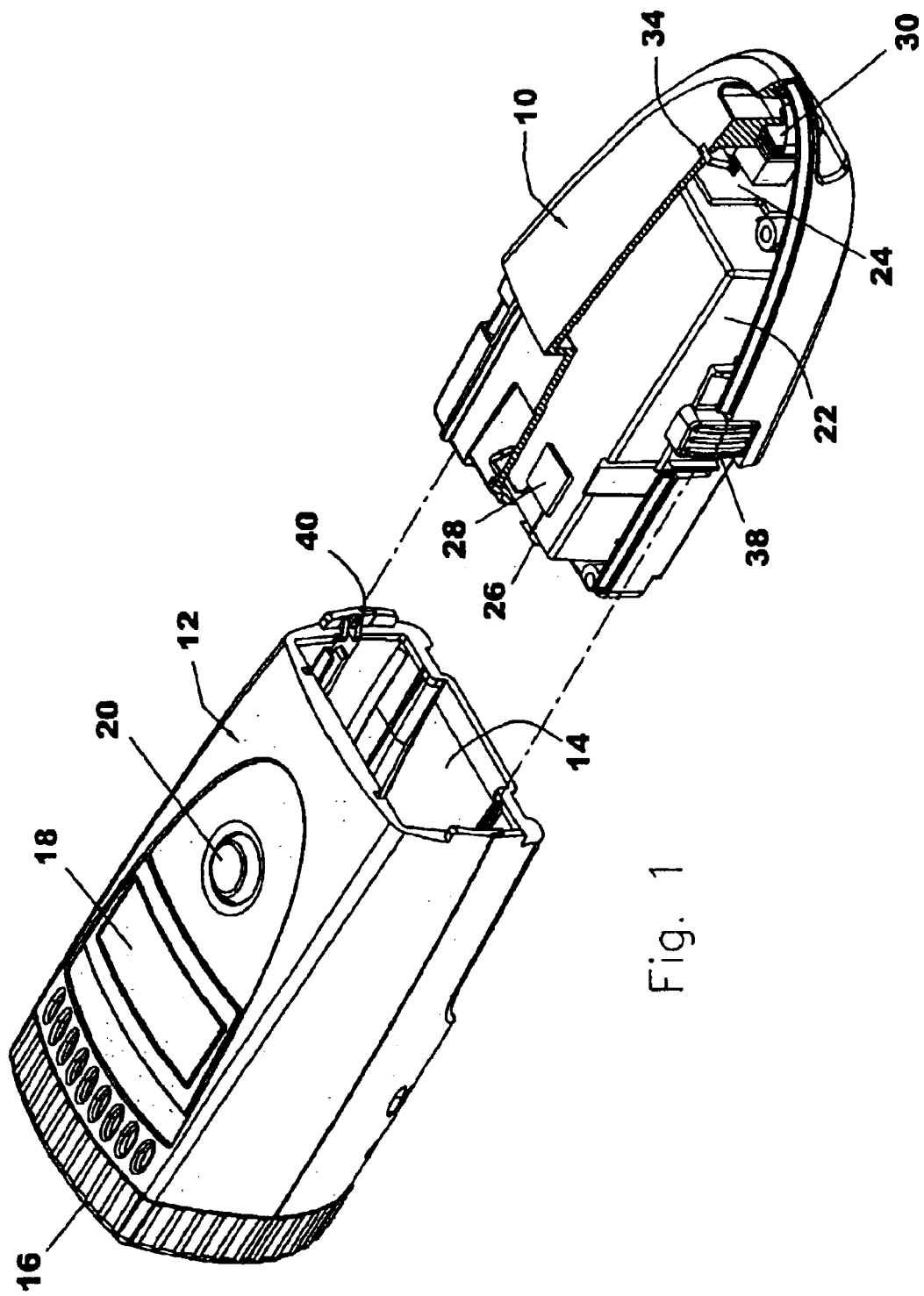
FIG. 1 is a perspective view of the stroboscope embodying the features of the present invention, with a partial cutaway of the power pack illustrating the components therein.
Figure 2:
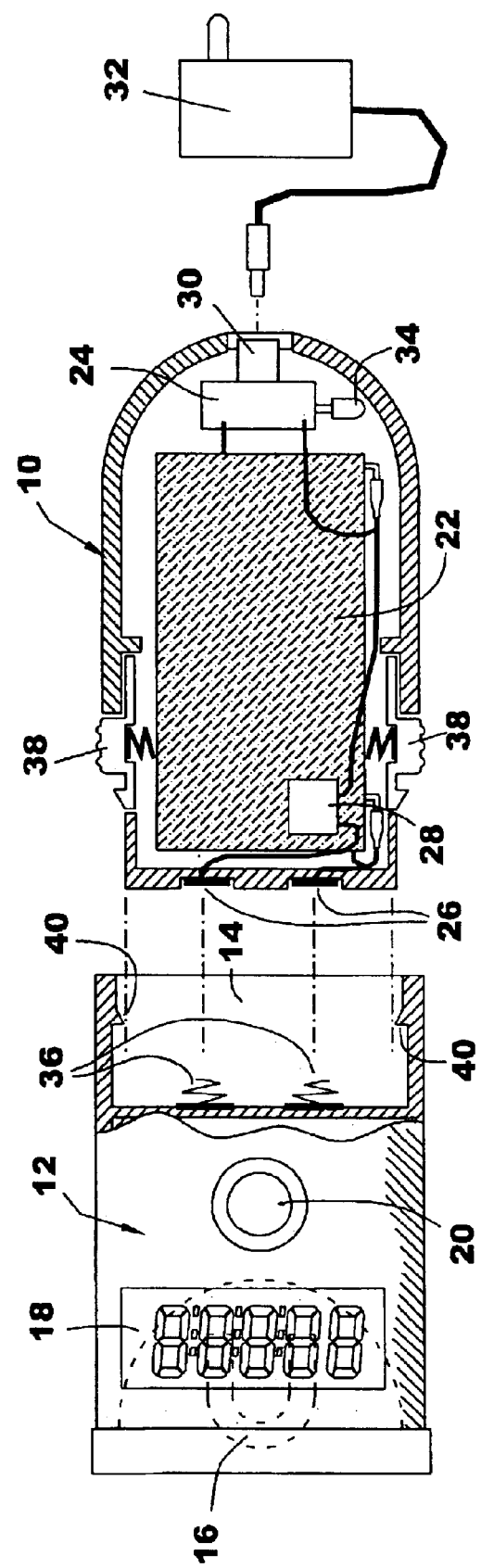
FIG. 2 is a stylized plan view of the stroboscope of FIG. 1, showing additional detail.

DETAILED DESCRIPTION FIGS. 1 and 2

FIGS. 1 and 2 illustrate a compact portable stroboscope constructed in accordance with a preferred embodiment of the present invention, the two primary parts shown in a separated configuration, the power pack, indicated generally as 10, removed from the main housing, generally indicated as 12. In order to be operational, the power back 10 is inserted into the opening 14 of the main housing 12 to form an integral unit.

The main housing of the stroboscope 12 contains the light source, in this embodiment represented as a flash lamp, 16, not visible in the perspective view of FIG. 1 but its implied position indicated, and shown as hidden detail in FIG. 2, the digital display 18, operator control mechanism 20 and control circuitry, internal and not shown.

The power pack 10 shown in this embodiment contains the battery 22, a rechargeable lead acid type, rectangular in shape, which connects to the charge control circuit board 24, and to the exposed power terminals 26 via fusible device 28, in this instance a resettable over current protector. The charge control circuit board 24 has a power supply connector 30 to enable an external power supply 32, shown in FIG. 2 only, to be connected to the power pack 10 to recharge the batteries. This external power supply 32 can be AC mains powered or DC powered, for example from a car cigarette lighter adaptor. The charge control circuit board 24 also has an indicator 34, in this embodiment, a light emitting diode, LED, to indicate the charge status of the battery during recharge. The discharge status of the battery in this embodiment, is one of the functions indicated on the stroboscope display 18, and indicates to the operator the approximate battery life remaining, and when the power pack needs to be replaced or recharged. The charge control circuit board 24 conditions the unregulated voltage from the external power supply 32, and adjusts it to provide a suitable fast charge to the battery 22 until it is fully charged at which point it switches to a trickle state and indicates this on the LED 34.

The exposed power terminals 26 on the power pack are use to make electrical connection with the mating power terminals 36, shown in FIG. 2, contained within the stroboscope main housing 12 and accessible through the opening 14. The load or passive power terminals 36 in the main housing 12 are sprung to provide positive pressure connections to the mating power terminals 26, which are the source or powered terminals. The power terminals 26 in the power pack 10 are recessed to prevent accidental external short circuit. The battery 22 is further protected by fusible device 28, which limits the current drain on the battery in the event of excessive load being drawn, as in a short circuit condition, and restores connection once the load has been removed.

The power pack 10 slides snugly into the opening 14 of the main housing 12 and is held in place by two sprung latches with clips 38 on the power pack, which engage against mating retaining ridges 40 in the main housing 12. This holds the power pack 10 firmly and securely in place, and tensions the sprung power terminals 36 in the main housing 12 against the power terminals 26 on the power pack 10 for positive electrical connection. The battery voltage is thus applied to the control circuitry in the main housing 12 via this connection and the Stroboscope is able to be operated. To release the power pack 10 the operator depresses the latch clips 38, which disengage from the retaining ridges 40 and the power pack can then be pulled from the main housing 12.

The battery 22 in the power pack 10 is discharged during stroboscope operation and is automatically recharged by the application of the external power supply 33 being plugged into the connector 30. This can be done with the power pack 10 latched within the main housing 12 since the power supply connector 30 is exposed, or the power pack 10 can be charged in a stand alone mode, separated from the main housing 12, as the charge control circuit board 24 is integral to the power pack 10.

DETAILED DESCRIPTION FIG. 3

Figure 3:
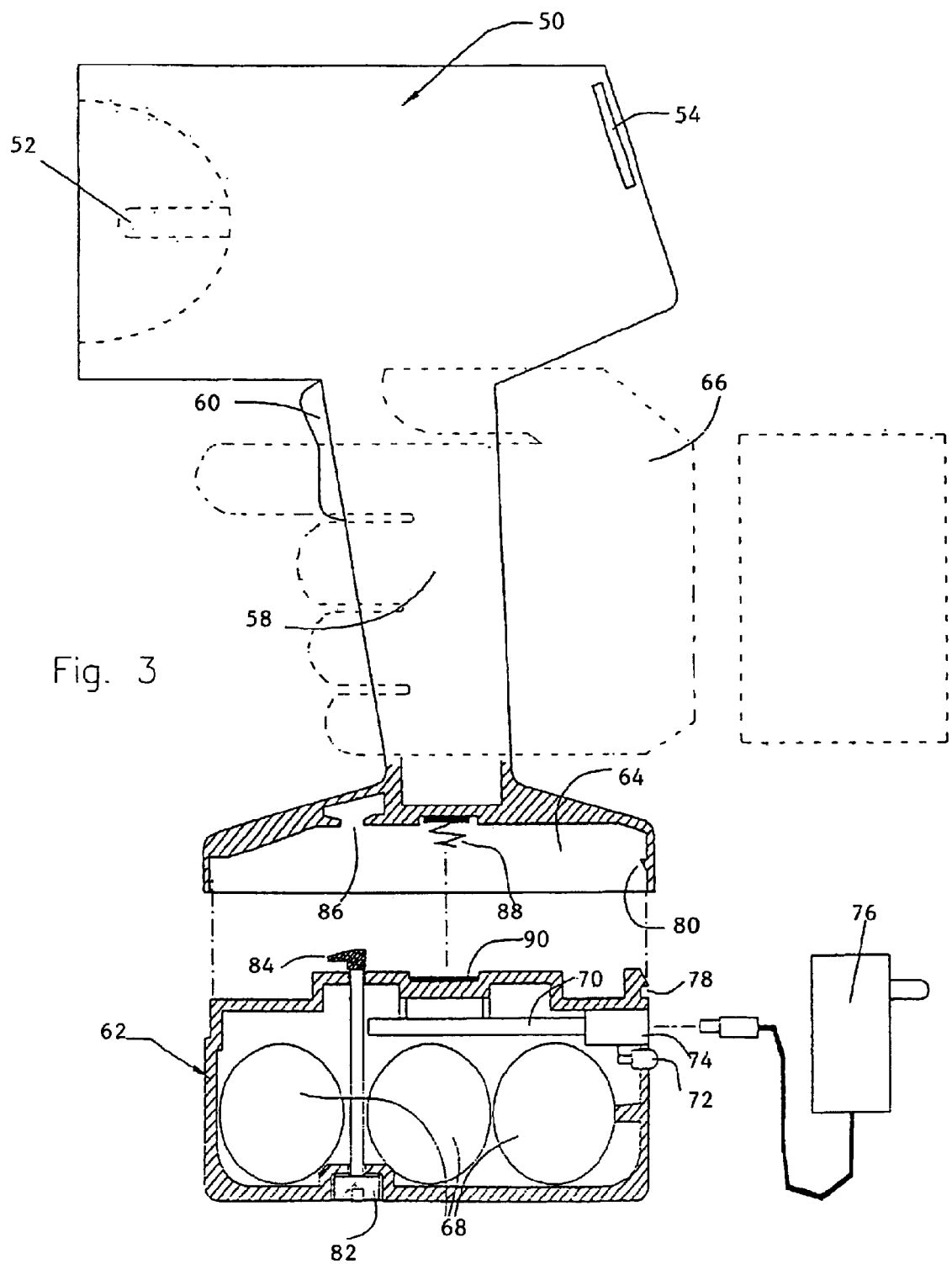
FIG. 3 is a stylized cross sectional side view of an alternate embodiment of the invention.

FIG. 3 is a stylized cross sectional side view of an alternate embodiment of the invention. For clarity, only parts and detail pertaining to the invention are shown. In this embodiment, the stroboscope main housing 50 is in the form of a pistol grip unit, with the light source 52, display 54, and control circuitry, not shown, enclosed I the body of the main housing 50 above the pistol grip handle 58. The operator control mechanism 60 is in the typical trigger position, and the power pack 62 attaches into an opening in a skirt 64 below the handle 58. When the stroboscope is gripped around the handle 58 this configuration provides a balanced, comfortable unit when the two parts 62,50 are assembled, the weight of the power pack 62 below the hand counter balanced by the weight of the body of the main housing 50 with its components. An outline of an operator's hand 66 is shown in hidden detail to illustrate this concept.

The power pack 10 62 in the embodiment of FIG 3 contains three rechargeable Nickel Metal Hydride (NiMH) batteries 68. The functions of the charge control circuit board 70, charge status indicator 72, external power supply connector 74 and external power supply 76 are identical to those described in FIGS. 1 and 2. In this embodiment, the power pack 62 fits into the opening of the skirt 64 of the main housing 50, and is retained by a hook 78 on the power pack 62 which engages on a lip 80 on the inside of the skirt 64, and is secured by a quarter turn screw 82 which extends through the power pack 62, between the batteries 68, and has a hook 84 that engages in a slot 86 in the skirt 64. In FIG. 3, the hook 84 is shown turned 90 degrees for clarity, which would be the locked position. The op of the slot 86 is angled in such a manner as to draw the power pack 62 into the skirt 64 as the screw 82 and hook 84 is turned through 90 degrees. This effectively tensions the sprung power terminals 88 in the main housing 50 and mating power terminals 54 on the power pack 62 together to provide good electrical connection. Alternatively, the power pack 62 in FIG. 3 could have been retained by the same latching mechanism shown in FIG. 2.

DETAILED DESCRIPTION FIG. 4

Figure 4:
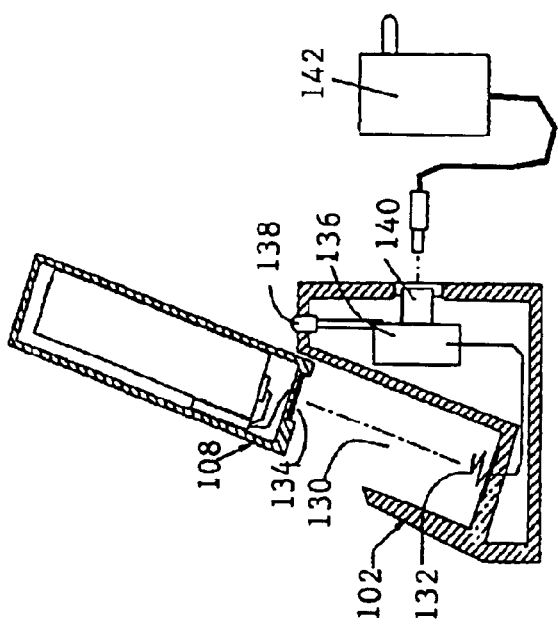
FIG. 4 is a stylized cross sectional side view of a third embodiment of the invention, with charger adaptor.
Figure 4:
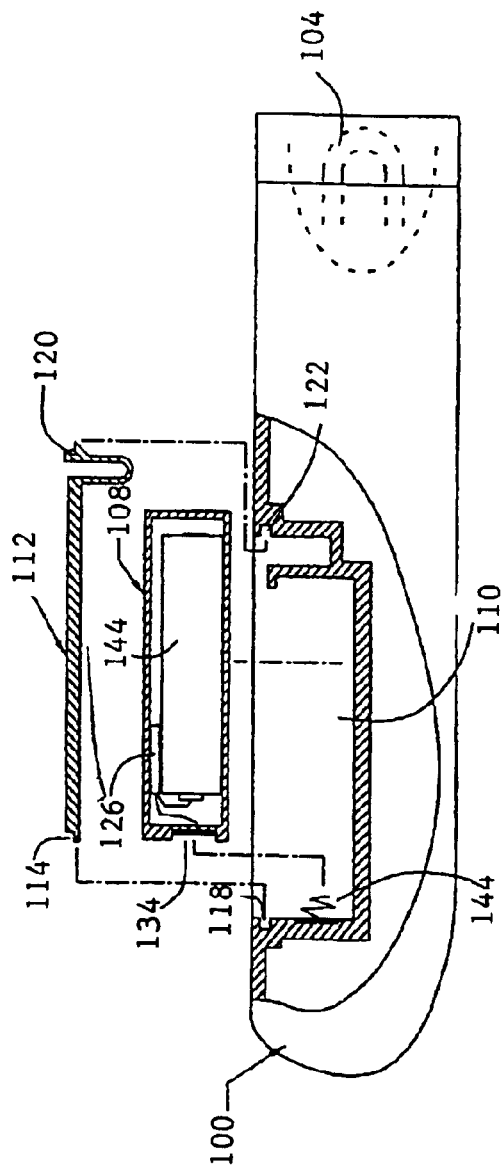

FIG. 4 shows a stylized side view of the main stroboscope housing 100, as well s a charger adapter 102 with cross sectional areas as shown. For clarity, only parts pertaining to the invention are shown. Many of the elements in this embodiment are similar to those in the embodiment of FIGS. 1, 2, and 3 and perform the same functions and thus carry the same reference numbers for clarity. Orientation is indicated by the lamp 104, shown in hidden detail.

In this embodiment, the power pack 108 fits into a compartment 110 and is completely enclosed and retained in the main housing 100 by a cover 112. This cover 112 has a lip 114 which fits into a slot 118 retaining one end, the other end has a sprung latch with clip 120 which engages against a mating retaining ridge 122 in the main housing 100. The power pack 108 in this embodiment is smaller than in the other two embodiments and contains only the batteries 124 and fusible link 126. This power pack 108 requires a separate autonomous charging adapter 128 that can accommodate the power pack 108 in a slot 130 and has power terminals 132 that connect to the power terminals 134 on the power pack 108 to transfer the power necessary to recharge the power pack 108. The charging adapter 102 contains the parts that in FIGS. 1, 2 and 3 were in the power pack itself, namely the charger control circuit board 136, charge status indicator 138 and connector 140 which accommodates the external power supply 142.

While there has been illustrated and described three embodiments of the present invention, it will be apparent that various changes, modifications and combinations thereof will occur to those skilled in the art. The foregoing is provided solely as examples of specific working embodiments, and in no sense as a limitation on the invention.

I claim:

1. A portable, stroboscope comprising:
   (a) a housing, said housing comprising a light source, control circuitry, a display and a user control mechanism;
   (b) a pair of housing power terminals located within said housing;
   (c) at least one removable replenishable power pack configured and dimensioned for attachment to said housing, said power pack including a plurality of power pack terminals that matingly connect to said housing power terminals when said power pack is attached to said housing; and
   (d) a means for directly replenishing said removable power pack when said removable power pack is attached to said housing and when it is detached from said housing;
   (e) said control circuitry providing a control pulse for flashing said light source at a constant periodic flash rate;
   (f) said display indicating a status of the removable replenishable power pack; and
   (g) said user control mechanism including means to trigger said control pulse and further means to adjust said periodic flash rate.

2. The stroboscope of claim 1 wherein said power pack comprises one or more rechargeable batteries.

3. The stroboscope of claim 1 wherein said means for replenishing said removable power pack comprises an AC mains powered charger.

4. The stroboscope of claim 1 wherein said power pack latches into an opening in said housing and is retained by sprung clips.

5. The stroboscope of claim 1 wherein said power pack is retained in said housing by a screw.

6. The stroboscope of claim 1 wherein said power pack is enclosed within the limits of said housing and is accessed by removal of a cover.

7. The stroboscope of claim 1 wherein said pair of first power terminals are resiliently deformed by contact with said pair of second power terminals when said power pack is in said operative position.

8. A portable stroboscope comprising:
   (a) a housing having a light source, control circuitry, a display and a user control mechanism;
   (b) a pair of first power terminals contained within an internal compartment of said housing and accessible via an opening in said housing communicating with said compartment;
   (c) a power pack having a front end closed by a front wall;
   (d) a pair of second power terminals on said front wall, the front end of said power pack being configured and dimensioned for insertion via said opening into an operative position within said compartment, with said second power terminals matingly connected to said first power terminals when said power pack is inserted in said housing;
   (e) a latching mechanism for releasably retaining the front end of said power pack in said operative position within said compartment;
   (f) a means for directly replenishing said removable power pack when said removable vower pack is in said operative position and when it is not in said operative position;
   (g) said control circuitry providing a control pulse for flashing the light source at a constant periodic flash rate;
   (h) said display indicating a status of said power pack; and
   (i) said user control mechanism including means to trigger said control pulse and further means to adjust said periodic flash rate.

9. The stroboscope of claim 8 wherein said latching mechanism comprises spring loaded clips on the front end of said power pack, said clips being configured to snap engage with internal ridges on said housing projecting inwardly into said compartment.

10. The stroboscope of claim 8 wherein said power pack is movable into and out of said operative position along an axis, and wherein said first and second power terminals are arranged symmetrically on opposite sides of said axis.

11. The stroboscope of claim 10 wherein said power pack contains a rechargeable battery, and wherein a connector arranged on said axis provides a means of detachably connecting said battery to an external power supply.

12. A portable stroboscope comprising:
   a housing, said housing comprising a light source, control circuitry, a display and a user control mechanism;
   (b) a pair of housing power terminals located within said housing;
   (c) at least one removable replenishable power packs configured and dimensioned for attachment to said housing, said power pack comprising at least one rechargeable battery and a plurality of power pack terminals that matingly connect to said housing power terminals when said power pack is attached to said housing, said power pack latches into an opening in said housing and is retained by sprung clips; and
   (d) a means for directly replenishing said removable power pack when said removable power pack is attached to said housing and when it is detached from said housing, said means for directly replenishing comprising an AC mains powered charger;
   (e) said control circuitry providing a control pulse for flashing said light source at a constant periodic flash rate;
   (f) said display indicating a status of the removable replenishable power pack; and
   (g) said user control mechanism including means to trigger said control pulse and further means to adjust said periodic flash rate.

* * * * *